United States Patent [19]
Laughinghouse et al.

[11] 3,761,774
[45] Sept. 25, 1973

[54] GROUND FAULT PROTECTIVE APPARATUS

[75] Inventors: Charles L. Laughinghouse, Linthicum, Md.; Walter H. Vogelsberg, Carversville, Pa.

[73] Assignee: The Black and Decker Manufacturing Company, Towson, Md.

[22] Filed: Mar. 20, 1970

[21] Appl. No.: 21,367

[52] U.S. Cl. ............... 317/18 A, 317/18 D, 317/53
[51] Int. Cl. ............................................. H02h 3/16
[58] Field of Search .................... 307/154, 131; 317/18 AI, 9 A, 18 D, 18 R, 27 R, 53; 310/50

[56] References Cited
UNITED STATES PATENTS

| | | | |
|---|---|---|---|
| 3,213,321 | 10/1965 | Dalziel | 317/27 |
| 3,351,813 | 11/1967 | Trout | 317/18 |
| 3,356,939 | 12/1967 | Stevenson | 317/53 X |
| 3,506,906 | 4/1970 | Nestor | 317/18 |

*Primary Examiner*—J. D. Miller
*Assistant Examiner*—Harvey Fendelman
*Attorney*—Leonard Bloom, Joseph R. Slotnik and Edward D. Murphy

[57] ABSTRACT

Simplified apparatus for disconnecting an electric appliance from the source of current upon the occurrence of a fault to ground through the tool. The apparatus may be located within the housing of the appliance or, preferably, at the connector which is inserted into a line voltage receptacle so that the entire appliance including its power cord is protected. The apparatus includes sensing means such as a differential transformer for detecting a difference in current between the two power lines leading to the appliance, resonant circuit means for producing a signal corresponding to such a difference, and circuit interruption means controlled by a semi-conductive switch which responds to the detected signal. Rectifying means are also provided to enable the apparatus to function regardless of the direction of current through the power lines to the appliance.

4 Claims, 4 Drawing Figures

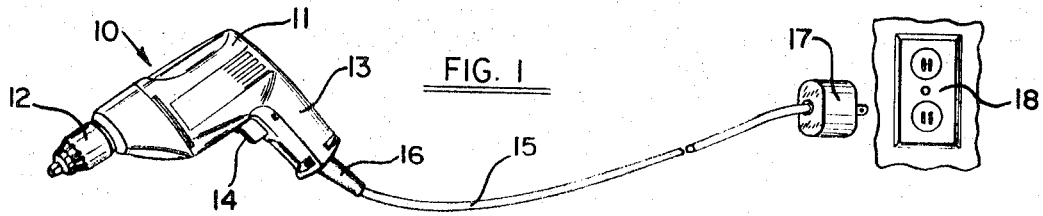
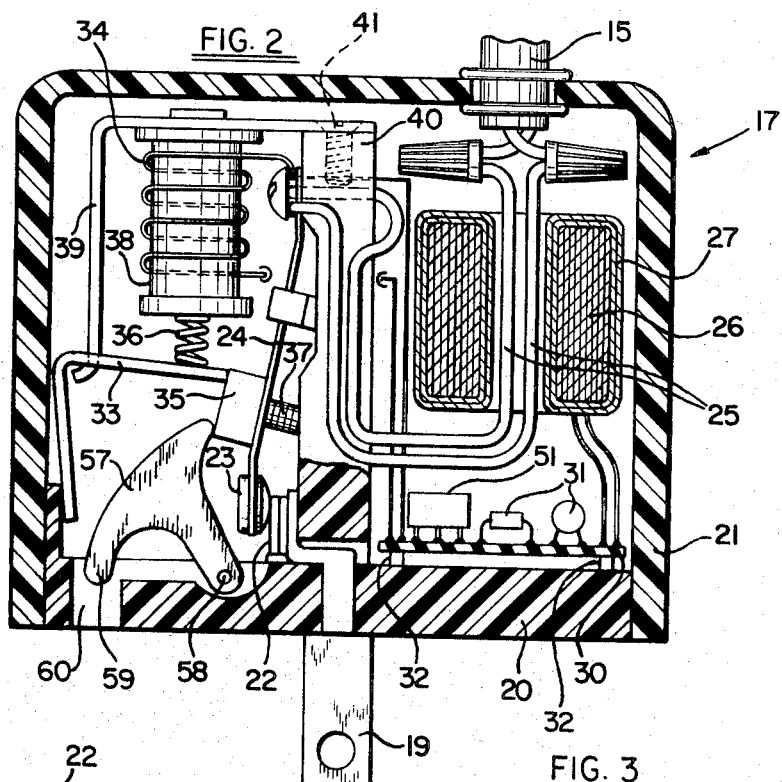
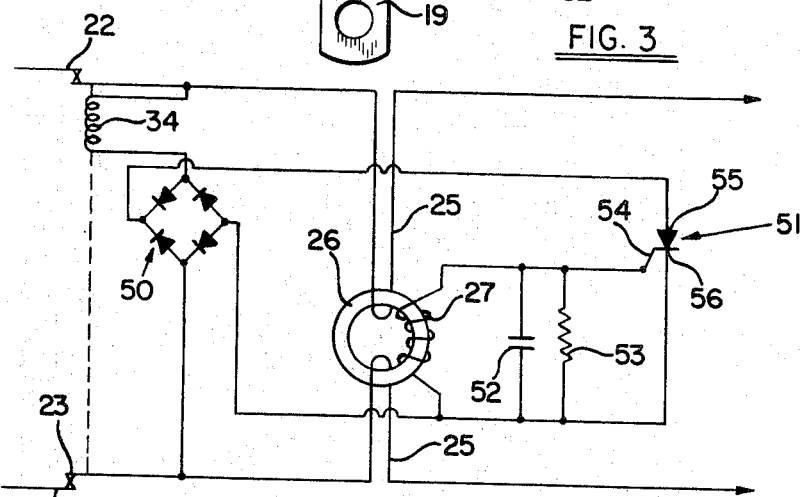
INVENTORS
WALTER H. VOGELSBERG
CHARLES L. LAUGHINGHOUSE
BY Edward D. Murphy
ATTORNEY

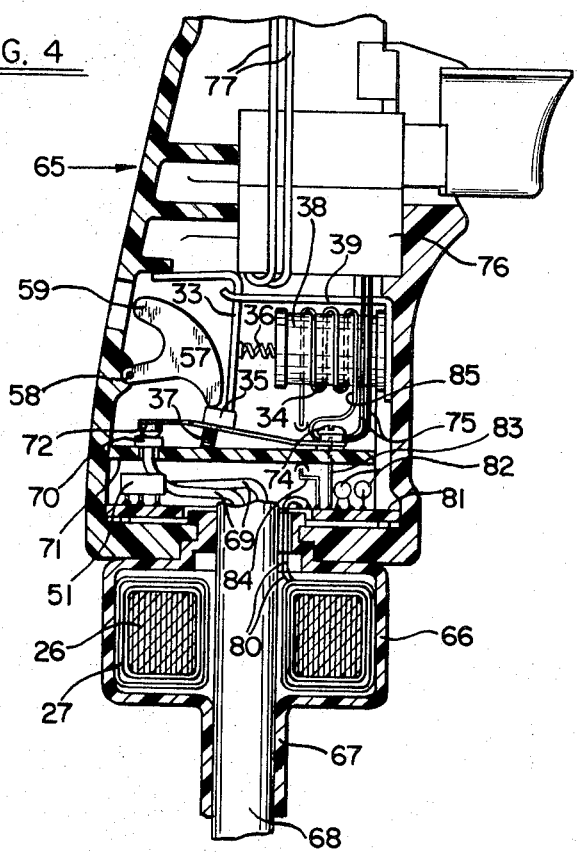

GROUND FAULT PROTECTIVE APPARATUS

The present invention relates to equipment for protection against electric shock.

For many years, efforts have been directed toward increasing the safety of electrical devices such as tools and appliances which are subjected to widely varying and potentially damaging conditions of use without benefit of periodic checking for safety. This is particularly true of portable tools and appliances used around the home but also may often be true of industrial devices since those responsible for the use or care of these devices may be uninformed of appropriate precautions or may become careless. One form of portection which is almost universally available, of course, is that of a fuse or circuit breaker which opens the electrical circuit in the event of excessive current. However, since currents in the range of milliamperes can be fatal, the high amperage protection afforded by such devices is obviously inadequate. Previous efforts to increase the protection available have produced some devices which are adequate to protect a user against the possibility of low level fault currents which would readily pass through a fuse but can kill or seriously injure the user. However, none of these units have been accepted, either by the consumer for use around the home or by commercial users such as industry or the construction trades. Two basic reasons explain the failure of users to accept these units; first, the high cost of such units and second, the inconvenience of using a bulky, complicated piece of equipment which may be even more likely to fail than the device it is intended to protect.

These problems with previous ground fault protection units arise from the technical nature of the systems. Specifically, the designers of these units have been guided by the objectives of maximum safety and protection; these objectives have so controlled the design approaches that the resulting circuits have been heavily over-engineered, with extra safety provisions, circuit checking features and functional redundancy; more significantly, even the basic circuits within these systems have been excessively elaborate. The present invention is, in part, based on the realization that such systems do not in fact provide the desired protection since they are not purchased or used by those who need the protection. Despite the availability of these units, neither consumers nor commercial users have been willing to pay a price ranging from one hundred to several hundred dollars for units which are awkward to use and which require some care in their use. The need, particularly at the consumer level but also at the commercial level, is for a compact, inexpensive unit which automatically provides adequate protection and which interrupts the circuit in the event of potential harm to the user. The purpose of the present invention is to provide a ground protection unit which meets these conditions.

Accordingly, it is an object of this invention to provide a new and improved ground fault protection device which is inexpensive, simple and convenient to use.

Another object of this invention is to provide a new and improved ground fault protection unit which provides adequate protection without need for complex circuitry.

It is also an object of this invention to provide a new and improved ground fault protection device which is substantially smaller, lighter and more readily useful than previously available devices.

These and other objects and advantages of this invention will become apparent as the description and illustration thereof proceed.

Briefly, in accord with one embodiment of this invention, an electric appliance such as a power tool is provided which includes improved ground fault protective apparatus. This apparatus may be provided in the housing of the appliance or in the power cord or connector. In accord with a preferred embodiment of this invention, the protective apparatus includes the minimum essential components so as to reduce the size, weight and cost. Specifically, the apparatus preferably includes differential transformer means to sense and produce a signal corresponding to a ground fault current, resonant circuit means and semiconductive switch means to operate a circuit interrupter. Rectifying means are also included so that the apparatus is not sensitive to the direction of current therethrough.

The invention and its various embodiments will be better understood from a consideration of the following specification and appended drawings in which:

FIG. 1 is a perspective view illustrating a representative appliance which includes the apparatus of the present invention;

FIG. 2 is a cross sectional view of the connector or the appliance of FIG. 1 which includes the apparatus of the present invention;

FIG. 3 is a schematic illustration of the preferred circuit for use in the ground protective apparatus of this invention; and FIG. 4 is a cross sectional view illustrating the protective apparatus of this invention incorporated in the handle portion of a pistol grip tool.

In FIG. 1, a portable electric drill 10 is illustrated which comprises a housing 11 containing an electric motor, a chuck 12 in which a drill bit or other output device is mounted, a handle portion 13 adapted to be grasped by an operator and a trigger 14 which is controlled by the operator to turn the motor on or off. Power to operate the device is supplied through a line cord 15 which enters the base of the handle portion via a strain relief 16. In accord with the present invention, the cord terminates in a plug 17 which is adapted to be plugged into a conventional receptacle 18 and which includes protective apparatus for disconnecting the tool from the source of power upon the occurrence of a ground fault at any point in the cord or in the tool.

Ground fault protection apparatus for electric devices is well known. Briefly, the ordinary fuse or circuit breaker protection is adequate only against short circuits wherein the current exceeds the rated value of the protective device. In many cases, a fault can occur from the appliance to a ground such as an operator's body with currents substantially less than the protective device rating but substantially more than that required to cause injury or death. Even very small currents can cause a reaction by the operator when he feels the shock and his involuntary motion may cause a secondary accident.

FIG. 2 illustrates the internal construction of the plug 17 wherein the ground fault protection apparatus of this invention is located. The function of this apparatus is to protect the operator against the small currents which, while not sufficient to trip a high amperage protective device, can cause injury. In accord with the prpsent invention, the provision of greatly simplified apparatus mounted at the plug end of the cord set of an appliance, tool, etc. overcomes the previous obstacles to the use of such devices and provides the desired protection. The plug 17 is inexpensive, lightweight and convenient and furthermore, due to the fact that it is built into the equipment, it is always used unless the operator goes to some considerable difficulty to remove it or defeat it. In normal application of such devices, the protective apparatus is simply a permanent, functioning part of the tool of which the operator may be only vaguely aware until it saves his life.

In the arrangement shown, a pair of blades are provided, one of which is shown at 19, which extend from the insulating base 20 of the plug for insertion into a standard receptacle. The blades 19 are connected within a housing 21 to a pair of contacts, one of which is shown at 22 and a second pair of contacts 23 provide for connection of the supply voltage through breaker arms 24 and leads 25 to the line cord 15. The leads 25 are directed through a toroidal core 26 of magnetic material. Under normal conditions, the current carried by each of the leads 25 is equal and travels in opposite directions. Thus, the flux produced in the core is zero since the two currents are equal and opposite. In the event of a fault, some of the current is diverted and flows to the external ground without passing through the lead of the pair 25 which is connected to ground through the receptacle. Thus, a differential current occurs within the core which causes a net flux. This flux is detected by the secondary coil 27 and used by the output circuit to cause the contacts 22 and 23 to open, thus interrupting the circuit.

Also included in the plug 17 is a circuit board 39 which supports the elements 31 of the electronic circuit. Conveniently, this board may be mounted on pedestals 32. The plug also includes a magnetically operated latch 33 which is operated by means of a coil 34 driven by the output of the electronic circuit. The latch 33 is normally positioned against an insulating latch block 35 which is mounted on both of the contact arms 24. The latch 33 is biased open by spring 36 and the contact arms and latch block are biased open by spring 37. The magnetic circuit for coil 34 and its core 38 is completed via frame member 39, and latch 33 which is pivotally mounted on the member 39. The frame member is also mounted on a central insulator block 40 by screws 41 and thus serves to support the coil.

When the circuit detects a sufficient fault and produces an output to the coil, the latch 33 is pulled upwardly against the coil, thus releasing the latch block and contact arms so that the spring bias force applied causes the contacts to open quickly. As soon as the contacts separate, the current supplied to the line cord is interrupted and the passage of current through the operator or through any other external ground path if stopped.

FIG. 3 illustrates the circuit which is embodied in the plug 17 of FIGS. 1 and 2 and which accomplishes the function of ground fault protection. As shown in this view, the contacts 22 and 23 are arranged to disconnect the power from the remainder of the circuit when the switch coil 34 is operated. The switch coil is connected across the power source in series with a full wave bridge 50. An SCR 51 is connected across the center of the bridge so that current will only be drawn through the relay 34 and the bridge 50 when the SCR is energized.

A gating signal to energize the SCR is derived from a differential transformer including core 26, secondary coil 27 and the primary coils which consist of the power leads 25 which pass through the center of the core. It is noted that multiple turn primaries may be used if desired.

As previously described, under normal conditions of equal current in the two conductors 25, the net flux in the core is zero and no current is developed in the secondary coil 27. Upon the occurrence of a fault at any point in the line cord 15 or in the tool 10, which would draw current through one of the wires 25 and direct this current to ground through the external path, the current unbalance causes a non-zero net flux in the core 26 and a signal is produced in the secondary coil 27. The signal in the coil 27 could be used to directly energize the SCR; however, it is preferred in accord with the present invention to reduce the power output demanded of the differential transformer by providing a capacitor 52. The value of this capacitor is selected so that, with the inductance of the secondary coil 27, a tuned circuit is provided which is resonant at the frequency of the applied power; i.e., 60 Hz. in the United States. The capacitor 52 also serves to filter transient spiked signals which may occur on plugging the tool into the receptacle or upon operation of the trigger switch 14 or which may be transmitted from other sources along the power lines to which the receptacle is connected. A resistor 53 may also be provided in parallel with the resonant circuit. This resistor provides a small amount of damping and permits the sensitivity of the circuit to be controlled. Thus, the fault current sensed by the differential transformer is applied to the gate 54 of the SCR. Due to the full wave bridge, the anode 55 of the SCR is positive on each half cycle relative to the cathode 56. Therefore, regardless of the direction of the fault current, or of the direction of the current in the secondary coil, the SCR is energized on either the first or the second half cycle after the fault current occurs. The flow of current through the SCR, the full wave bridge and the switch coil 34 causes tripping of the latch member 33 against the force of its spring 36. As soon as the latch member 33 clears the insulator block 35, the force of springs 37 separates the contacts 23 from the contacts 22 and interrupts the circuit. Appropriate arc chambers and venting may be provided to prevent the possibility of danger due to arcing between the contacts in the event of a very high current. In addition, the insulating materials in the neighborhood of the contacts should be of an appropriate material such as urea formaldehyde to withstand the effects of a possible high current arc.

After interruption of the circuit has occurred, the tool is disabled and the operator knows that some fault has occurred which must be corrected before he can safely continue to use the device. To insure the operator's awareness of the situation and to prevent the possibility that a careless operator may simply try to reset the device repeatedly or hold the reset button in to prevent the circuit from functioning while he continues to use the device, it is a particular feature of this invention that the reset control member 57 is provided in such a position that the plug 17 must be removed from the receptacle before the operator can reset the trip contacts. Thus, the member 57 is mounted about a pivot 58 and has an arm 59 extending through an aperture 60 in the base 20 of the plug 17. After the plug has been removed from the receptacle, and presumably after the fault in the device has been corrected, the operator depresses the arm 59. This moves the insulator block 35 and contact amrs 24 against the force of spring 37 to the closed position at which point, due to the force of spring 36, the latch 33 drops into place to hold the contacts closed. If the fault has not been corrected, the operator inserts the plug into the receptacle and, as soon as the fault current appears, the protection circuit trips the contacts open again, thus maintaining the desired protection.

Another significant feature of this invention is the provision of means for eliminating any polarity sensitivity from the plug 17. Many of the receptacles in use in this country contain no indication as to which side of the receptacle is live and, in the case of three wire receptacles which should be identifiable, many are incorrectly wired and thus would lead to incorrect connection. To accomplish this desensitization, it is necessary to arrange the circuits that a positive signal from the differential transformer arrives at the gate 54 of the SCR at the same moment as a positive signal is applied thereto from the line. In FIG. 3, this is accomplished by means of the full wave bridge 50 which rectifies the line signal applied to the SCR so that, on every half cycle, the anode 55 of the SCR is positive relative to its cathode 56. Thus, regardless of whether the plug 17 is inserted into the receptacle so as to produce a gate signal in phase or out of phase with the line signal, the SCR may become energized when the positive gate signal is received, on either the first or the second half cycle after initiation of the fault. Other means of accomplishing this might also be provided such as providing full wave rectification of the output of the secondary coil.

FIG. 4 illustrates an alternative embodiment of this invention wherein the ground fault protection circuit elements are located within the handle 65 of a portable electric tool such as a drill. The upper portion of the drill which would include an electric motor and an output means has been omitted. In this embodiment, the magnetic core 26 and secondary coil 27 are conveniently located within an enlarged poation 66 of a strain relief 67 so that the power cord 68 extends through the center of the core 26. The cord 68 terminates in a conventional plug for insertion into a receptacle to supply power to the tool. In this arrangement, the passage of the two power wires 69 through the center of the core, in view of the fact that the currents therein are in opposite directions, provide a pair of single turn primary coils for the differential transformer, in the manner illustrated schematically in FIG. 3.

The wires 69 are connected to a pair of terminals 70 which are mounted on an insulator 71. Movable contacts 72 are mounted on a pair of arms 73 which are mounted to the insulator 71 via screws 74. Leads 75 extend upwardly from the screws 74 to a switching device 76 and leads 77 extend from the switch to the motor in the upper portion of the tool. As illustrated, the switch 76 may comprise a trigger operated on-off switch; it may incorporate a speed control, a reversing device or other features as may be desired in the particular tool.

The leads 80 from the secondary coil 27 extend upwardly from the strain relief 67 and are attached to a printed circuit board 81 which is mounted in the base of the handle 65. As in the embodiment shown in FIG. 2, the required circuit elements 82 are mounted on the circuit board and appropriate electrical interconnections among these elements are provided by means of copper strips. The circuit may correspond to that shown schematically in FIG. 3.

A pair of leads 83 and 84 extend upwardly from the circuit board. One lead 83 is connected directly to one of the screws 74 while the other lead 84 is connected to the coil 34 of the circuit breaker. The other side of the circuit breaker coil is connected to the other screw 74 by a lead 85, thus completing the connection of the protective circuit to the power source.

The electrical operation of this device is identical to that described in connection with FIGS. 2 and 3 and, since the mechanical components are the same, the same identifying numbers have been used. As in the previous embodiment, normal operation draws equal and opposite current through the wires 69 and the secondary coil 27 produces no output. As soon as a sufficient fault current arises, the output of the secondary coil causes energization of the gate 54 of an SCR 51, thus enabling current to flow through the circuit breaker coil 34. The latch member 33 is then pulled to the right in FIG. 4 against the force of spring 36. As soon as the latch block 35 is released, the spring 37 forces contacts 72 to separate from the contact 70, thus interrupting the device from the power supply. As soon as the power is disconnected, the power to circuit breaker coil 34 is also disconnected; however, the latch member is now trapped by the right hand side of latch block 35 and the contacts remain open until the latch block is depressed by the operator through reset lever 57.

As in the case of the previous embodiment of the present invention, the FIG. 4 embodiment provides for the incorporation of the desired protective circuit in a compact, inexpensive and simple fashion. The circuit takes up essentially no extra space and adds only a small amount to the weight of the tool. It causes no inconvenience since it is in an unobtrusive location and, as in the case of FIG. 2, the operator may hardly be aware of it until the need for it arises.

As previously noted, these embodiments of the present invention are based upon the realization that elaborate protective devices are neither necessary nor useful, as well as upon the determination of a minimum circuit which, cased upon the prior art, would be thought to be inadequate, but which is, in fact, more sensitive than previous devices. This increased sensitivity is a particular significant aspect of this invention since a reaction to a "SHOCK" on the part of the operator, in many situations where power tools are used, may be particularly undesirable. Even though the shock current or duration is only of a minor level, it may cause the operator to move the tool involuntarily, with resultant damage to the workpiece. In other cases, for example due to a precarious location on scaffolding or in building structures, the operator's reaction may cause him to fall with serious or fatal consequences. In these and other situations, therefore, it is desirable to avoid even the minimum noticeable fault current before removing power from the device. In part, this objective can be met because the circuit is provided in a plug or in the handle of a specific tool and it can therefore be designed for use with that specific tool. It does not have to be a universal circuit designed to operate under a variety of conditions, load currents, etc. In addition, due to the simplicity of the circuit and its physical arrangement, increased sensitivity without undue sensitivity to transients can be obtained.

For these reasons, the circuit illustrated in FIG. 3 includes only the necessary elements and a feature of this invention arises from the fact that increased sensitivity is achieved with the simplified circuit shown. For example, previous devices have required a substantial amount of time before tripping even on currents as high as 20 milliamps and have required substantially higher currents if tripping is to occur within the first few current cycles. Since injury can be caused by currents lower than 20 ma if applied for a sufficient time as well as by high currents even though the duration is only a few cycles, these devices do not provide sufficient protection. In contrast, the circuit of the present invention is capable of tripping a fault current as low as 3 ma. Even at this current level, the tripping signal is provided within one cycle of current so that, if a reasonably fast circuit breaker is provided, the circuit is disconnected within two to three cycles and the operator is subjected to only a minimum current.

It is noted that these values are substantially below the minimum let-go current for almost all people and also are so low as to substantially reduce the occurrence of severe shock which may cause harm due to the rection of the operator.

The several embodiments of this invention which have been shown and described are for illustration only. It will be apparent to those skilled in the art that many changes and modifications may be made without departing from the basic concept of a simplified, convenient protective apparatus which is of improved effectiveness. The appended claims are therefore intended to cover all such changes and modifications as fall within the true spirit and scope of this invention.

We claim:

1. In an electric tool having an electric motor, an output shaft for providing power to a work-engaging element, switch means for controlling the application of a voltage to said motor, and a power cord including a connector comprising a pair of prongs extending from a flat exterior surface for insertion into a receptacle for connecting said tool to a source of electric current, the improvement comprising means incorporated in said tool for disconnecting said tool from said source upon the occurrence of a fault current through said tool and including means for detecting a fault current through said tool; and means responsive to said detection means for interrupting the current through said connector;

said disconnecting means being included in said connector whereby faults occurring in said power cord cause said disconnecting means to operate; and reset means for said disconnecting means, said reset means comprising a mechanical latch having a reset button mounted in said flat surface whereby said reset means can only be operated when said connector has been removed from said receptacle.

2. In an electric tool having an electric motor enclosed in a housing, an output shaft for providing power to a work-engaging element, switch means for controlling the application of a voltage to said motor, and a power cord, said cord including a connector for connecting said tool to a standard source of electric current, and a strain relief member at the point of entry thereof into said housing to control the degree of flexing of said cord; the improvement comprising a self-contained protective device incorporated in said tool for disconnecting said tool from said source upon the occurrence of a fault current through said tool, said device including means for detecting a fault current through said tool at a value substantially less than the operating current of said tool; and means responsive to said detection means for interrupting the current through said connector; said detecting means including a differential current sensing means disposed within said strain relief member to sense the net current passing through said power cord.

3. Apparatus as claimed in claim 2 wherein said housing includes a handle adapted to be grasped by the operator of said tool and said disconnecting means is located within said handle.

4. Apparatus as claimed in claim 2 wherein said differential sensing means comprises a toroidal core of magnetic material having a secondary winding thereon, said core being disposed in surrounding relationship to said power cord; said secondary coil being arranged to cause operation of said disconnecting means upon the occurrence of a non-zero net current within said power cord.

* * * * *